(12) United States Patent
Kleinsasser

(10) Patent No.: US 8,051,805 B2
(45) Date of Patent: Nov. 8, 2011

(54) ONE WAY GATE FOR ANIMALS

(75) Inventor: Jonathan Kleinsasser, Ste. Agathe (CA)

(73) Assignee: Crystal Spring Colony Farms Ltd., Ste. Agathe, MB (CA)

( * ) Notice: Subject to any disclaimer, the term of this patent is extended or adjusted under 35 U.S.C. 154(b) by 99 days.

(21) Appl. No.: 12/406,215

(22) Filed: Mar. 18, 2009

(65) Prior Publication Data

US 2010/0236495 A1    Sep. 23, 2010

(51) Int. Cl.
*A01K 1/00* (2006.01)
*A01K 1/02* (2006.01)
(52) U.S. Cl. ............... 119/524; 119/503; 119/507
(58) Field of Classification Search .......... 119/502–503, 119/506–507, 516, 522, 524, 840
See application file for complete search history.

(56) References Cited

U.S. PATENT DOCUMENTS

| | | | | |
|---|---|---|---|---|
| 3,415,227 A | * | 12/1968 | Welsh ............ | 119/524 |
| 3,785,346 A | * | 1/1974 | Dower ............ | 119/524 |
| 3,894,516 A | * | 7/1975 | Schaefer ............ | 119/840 |
| 4,150,638 A | * | 4/1979 | Vandenberg et al. ....... | 119/741 |
| 4,177,762 A | * | 12/1979 | Borcherding ............ | 119/507 |
| 4,198,927 A | * | 4/1980 | Guiavarc'h ............ | 119/524 |
| 4,513,691 A | * | 4/1985 | Wood ............ | 119/734 |
| 5,584,261 A | * | 12/1996 | Hart et al. ............ | 119/14.03 |
| 5,979,365 A | * | 11/1999 | Sorraghan et al. ......... | 119/524 |
| 7,530,332 B2 | * | 5/2009 | May et al. ............ | 119/502 |
| 7,810,450 B2 | * | 10/2010 | Sensenig ............ | 119/14.03 |
| 2008/0302310 A1 | * | 12/2008 | Kleinsasser ............ | 119/521 |

FOREIGN PATENT DOCUMENTS

JP         4-281728    * 10/1992

* cited by examiner

*Primary Examiner* — David Parsley
(74) *Attorney, Agent, or Firm* — Adnan D. Battison; Ade & Company Inc.

(57) ABSTRACT

A one way gate primarily for pigs is located between a pair of parallel panels to be mounted in a fence line and includes two gate portions each defined by a transverse rail across the passage between the panels at a height above the passage and a plurality of fingers hanging from the rail separately pivotal in one direction only to the animal to pass and prevented from rotation in the opposite direction. The distance between the gate portions is less than 3.0 feet so as to be less than the length of the animal to prevent an animal being located between the rails and greater than 0.5 feet such that an animal attempting to lift the second fingers cannot simultaneously lift the first fingers.

6 Claims, 2 Drawing Sheets

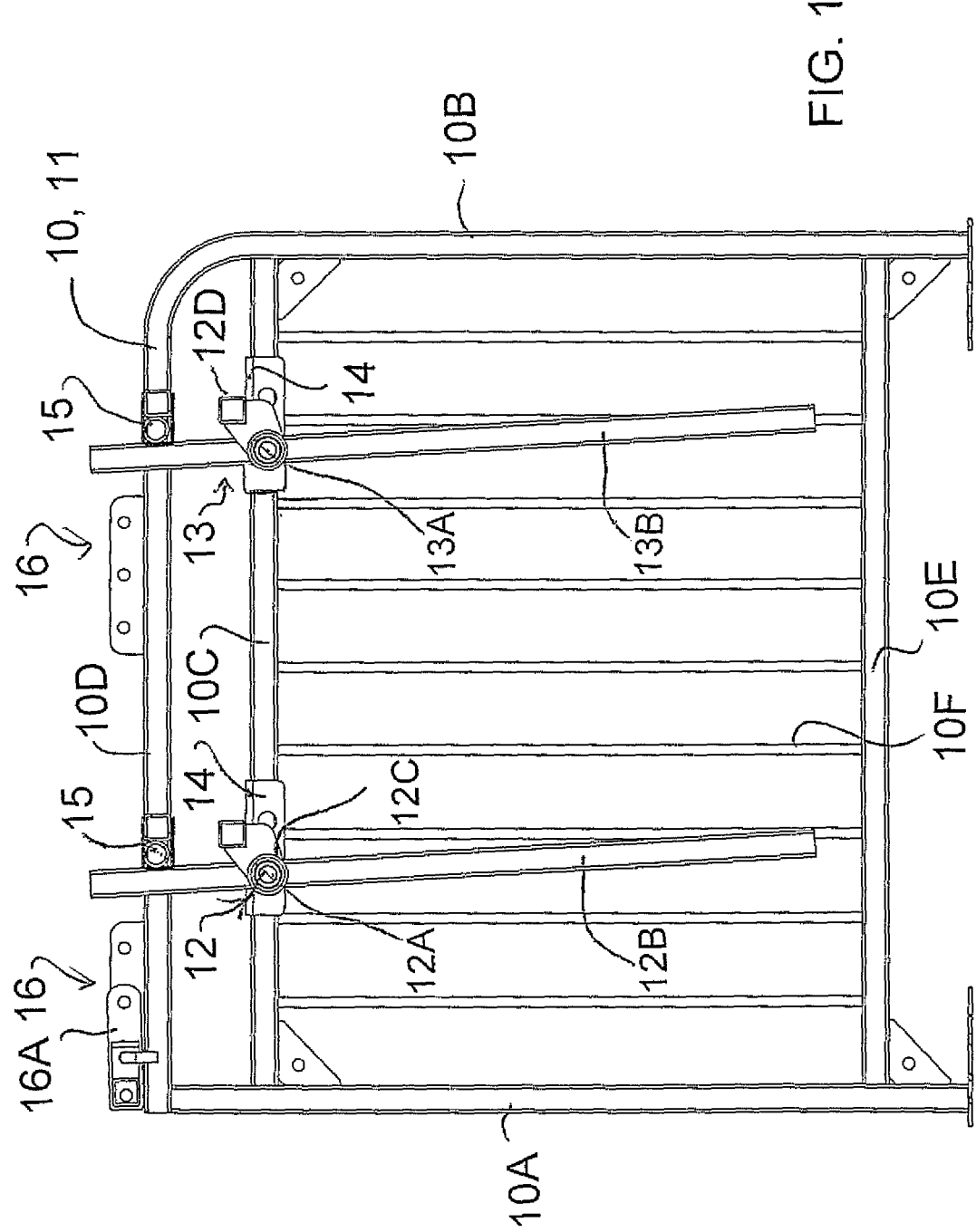

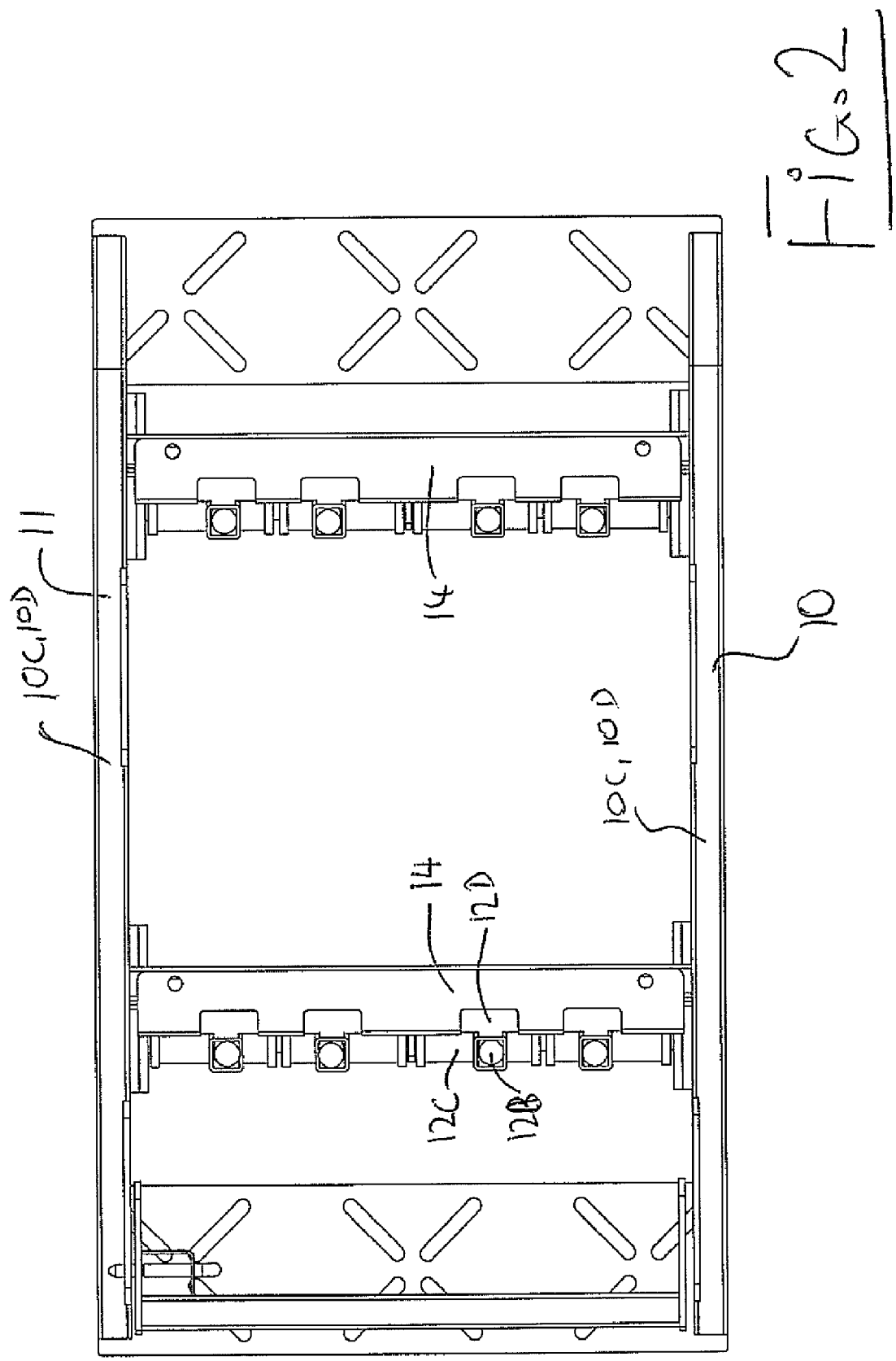

ONE WAY GATE FOR ANIMALS

This invention relates to a one way gate for animals.

BACKGROUND OF THE INVENTION

It is known to provide a one way gate which spans a pair of parallel side panels so as to allow animals to pass between the panels in one direction only, with the intention of preventing the animals from turning an passing back in the opposite direction. Such gates are typically used for pigs to manage the pigs between pens so that they can access a second pen from a first pen but cannot turn around and go back. The gate should not inhibit the animals from moving in the required direction. The gate can form part of an alley but more commonly the panels are placed in an opening in a fence line between the two pens with the panels at right angles to the fence line.

It is known that such a gate is formed by a series of depending fingers at spaced positions across the space between the panels and carried on a top rail so that each finger can pivot about a horizontal axis defined at the rail allowing the lower end of the finger to lift to a position where the animal can pass underneath the raised fingers and underneath the rail. The fingers can pivot from a hanging position only in one direction to prevent passage in the reverse direction. The animal lifts enough of the fingers to allow it to pass simply by pushing against the fingers. The intention is that it is sufficiently difficult for the animals to lift the fingers to prevent passage in the reverse direction even.

However it is found that some pigs can get back in the reverse direction by working on lifting the fingers until they achieve a condition where enough fingers are lifted which may combine with the passage of another pig in the intended direction thus allowing a pig to escape. This is of course unacceptable in a management system which relies on the reverse passage of none of the pigs. The pigs tend to try extensively to pass in the reverse direction because they are naturally curious and in some cases the food or water may be in the first pen giving a higher incentive.

SUMMARY OF THE INVENTION

It is one object of the invention to provide a one way gate for animals which is of a simple construction and yet reduces the possibility for an animal to pass in the reverse direction relative to the construction described above.

According to one aspect of the invention there is provided a one way gate for animals comprising:

a pair of parallel panels defining a passage therebetween for the animals to pass;

a first transverse rail at a height above the passage;

a plurality of first fingers hanging from the first rail at positions spaced across the passage to prevent passage of the animal between the first fingers;

each first finger being pivotal about a transverse horizontal axis at or adjacent the first rail in one direction only to allow the first fingers to lift and the animal to pass in said one direction with a stop member provided to prevent rotation in the opposite direction;

a second transverse rail at a height above the passage;

a plurality of second fingers hanging from the first rail at positions spaced across the passage to prevent passage of the animal between the second fingers;

each second finger being pivotal about a transverse horizontal axis at or adjacent the second rail in one direction only to allow the second fingers to lift and the animal to pass in said one direction with a stop member provided to prevent rotation in the opposite direction;

the second rail being spaced along the passage in said one direction by a distance from the first rail;

the distance being less than 3.0 feet so as to be less than the length of the animal to prevent an animal being located between the rails;

and the distance being greater than 0.5 feet such that an animal attempting to lift the second fingers cannot simultaneously lift the first fingers.

Preferably the distance is in the range 1.0 to 2.0 feet and more preferably of the order of 1.5 feet.

Preferably the fingers are straight and parallel when in the hanging position.

Preferably each set of fingers includes a locking arrangement for locking the fingers in the hanging position to prevent passage of the animal in both directions and for locking the first fingers in a raised position to allow free passage of the animal in both directions.

BRIEF DESCRIPTION OF THE DRAWINGS

One embodiment of the invention will now be described in conjunction with the accompanying drawings in which:

FIG. 1 is a side elevational view of a one way gate according to the present invention.

FIG. 2 is a top plan view of the gate according to the present invention of FIG. 1.

In the drawings like characters of reference indicate corresponding parts in the different figures.

DETAILED DESCRIPTION

The one way gate for animals and primarily pigs is formed by a pair of parallel panels 10 and 11 defining a passage therebetween for the animals to pass. The panels are intended to be mounted in a fence line between two pens where the panels are arranged at right angles to eth fence line. The panels are formed by a pair of end uprights 10A and 10B, three cross rails 10C, 10D and 10E together with a plurality of bars 10F. The top two rails 10C and 10D are arranged parallel and above the passage through which the animal can pass.

The gate further includes two gate portions 12 and 13 spaced along the panels 10, 11 at a distance between the gate portions Each gate portion comprises a transverse rail 12A, 13A and a plurality of hanging, straight and parallel fingers 12B, 13B.

The rails 10C of the panels 10 and 11 form end supports for the transverse rails 12A, 13A at a height above the passage. The fingers hang from the rails at positions spaced across the passage with the fingers spaced by a distance of the order of 0.5 feet to prevent passage of the animal between the first fingers;

Each finger is carried on a respective one of a series of collars 12C surrounding the rail so as to be individually or separately pivotal about a transverse horizontal axis defined by the rail. The fingers can pivot in one direction only, that is the counter-clockwise direction as shown, to allow the fingers to lift and the animal to pass in that direction, that is toward the right, with a stop member 12D provided on each collar 12C to but against a plate 14 spanning the rails to prevent rotation in the opposite direction. The fingers hang at a position spaced slightly from the vertical so that their weight tends to hold the fingers against the stop 14.

The fingers also project upwardly from the respective collars to a position above the rails 10C where the fingers butt against a further transverse stop rail 15. This assists the stop bar 14 so that the fingers have sufficient strength to resist vigorous attempts by the animal to return in the opposite direction against the gate.

There is provided for each gate portion a locking arrangement 16 with a latch portion 16A extending a cross the passage for cooperating with all the fingers, with the latch portion being movable to a first position for locking the fingers in the hanging position so that the fingers are locked in both directions to prevent passage of the animal in both directions. The latch portion 16A is also movable to a second position for locking the fingers in a raised position to allow free passage of the animal in both directions.

The second gate portion is spaced along the passage by a distance from the first gate portion which is less than 3.0 feet so as to be less than the length of the animal to prevent an animal being located between the rails and greater than 0.5 feet such that an animal attempting to lift the second fingers cannot simultaneously lift the first fingers.

The distance for these required functions can vary but is more preferably in the range 1.0 to 2.0 feet and preferably in an embodiment suitable for finisher pigs of the order of 1.5 feet.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A one way gate for animals comprising:
   a pair of parallel panels defining a passage therebetween for the animals to pass;
   a first transverse rail at a height above the passage;
   a plurality of first fingers connected to the first rail at positions spaced across the passage to prevent the animal from passing between the plurality of first fingers;
   the first fingers being pivotal in a forward direction of the passage about a first transverse horizontal axis at or adjacent the first rail between a first depending position, in which the first fingers extend downwardly from the first rail across the passage to prevent the animal from passing underneath the downwardly extending first fingers, and a second raised position, in which the animal can pass underneath the raised first fingers;
   a first stop member arranged to prevent pivotal movement of the first fingers from the first depending position in a rearward direction of the passage opposite to said forward direction to prevent the animal from moving past the first fingers in the reverse direction;
   a second transverse rail at a height above the passage;
   a plurality of second fingers connected to the second rail at positions spaced across the passage to prevent the animal from passing between the plurality of second fingers;
   the second fingers being pivotal in a forward direction of the passage about a second transverse horizontal axis at or adjacent the second rail between a first depending position, in which the second fingers extend downwardly from the second rail across the passage to prevent the animal from passing underneath the downwardly extending second fingers, and a second raised position, in which the animal can pass underneath the raised second fingers;
   a second stop member arranged to prevent pivotal movement of the second fingers from the first depending position in a rearward direction of the passage opposite to said forward direction to prevent the animal from moving past the second fingers in the reverse direction said one direction with a stop member provided to prevent rotation in the opposite direction;
   the second rail and the second axis being spaced along the passage in said forward direction by a distance from the first rail and the first axis;
   the first fingers being pivotal about the first axis between the first depending position and the second raised position independently of pivotal movement of the second fingers about the second axis between the first depending position and the second raised position;
   the distance being less than 3.0 feet so as to be less than the length of the animal to prevent an animal being located between the rails;
   and the distance being greater than 0.5 feet such that an animal attempting to lift the second fingers cannot simultaneously lift the first fingers.

2. The one way gate according to claim 1 wherein the distance is in the range 1.0 to 2.0 feet.

3. The one way gate according to claim 1 wherein the distance is of the order of 1.5 feet.

4. The one way gate according to claim 1 wherein the first fingers are in the first depending position thereof parallel to the second fingers in the first depending position thereof.

5. The one way gate according to claim 1 wherein there is provided a first locking arrangement for locking the first fingers in the first depending position to prevent passage of the animal in both the forward and rearward directions and for locking the first fingers in the second raised position to allow free passage of the animal in both directions and a second locking arrangement for locking the second fingers in the first depending position to prevent passage of the animal in both the forward and rearward directions and for locking the second fingers in the second raised position to allow free passage of the animal in both directions.

6. The one way gate according to claim 1 wherein the first fingers are pivotal about the first axis independently of one another and wherein the second fingers are pivotal about the second axis independently of one another.

* * * * *